United States Patent
Dolega et al.

(10) Patent No.: US 10,689,734 B2
(45) Date of Patent: *Jun. 23, 2020

(54) EXTRUDED 6XXX ALLOY PRODUCT THAT IS SUITABLE FOR TURNING AND HAS LOW ROUGHNESS AFTER ANODISATION

(71) Applicant: CONSTELLIUM EXTRUSION DECIN S.R.O., Decin (CZ)

(72) Inventors: Lukasz Dolega, Grenoble (FR); Jean-sylvestre Safrany, Voiron (FR); Ivo Kolarik, Decin (CZ)

(73) Assignee: CONSTELLIUM EXTRUSION DECIN S.R.O., Decin (CZ)

( * ) Notice: Subject to any disclaimer, the term of this patent is extended or adjusted under 35 U.S.C. 154(b) by 748 days.

This patent is subject to a terminal disclaimer.

(21) Appl. No.: 15/127,414

(22) PCT Filed: Mar. 20, 2015

(86) PCT No.: PCT/EP2015/000614
§ 371 (c)(1),
(2) Date: Sep. 19, 2016

(87) PCT Pub. No.: WO2015/144303
PCT Pub. Date: Oct. 1, 2015

(65) Prior Publication Data
US 2018/0202026 A1    Jul. 19, 2018

(30) Foreign Application Priority Data

Mar. 24, 2014 (FR) .................................. 14 00703

(51) Int. Cl.
*C22C 21/08* (2006.01)
*C22F 1/047* (2006.01)
(Continued)

(52) U.S. Cl.
CPC .............. *C22C 21/08* (2013.01); *C22F 1/047* (2013.01); *B21C 23/14* (2013.01); *C25D 11/16* (2013.01)

(58) Field of Classification Search
None
See application file for complete search history.

(56) References Cited

U.S. PATENT DOCUMENTS 3,524,799 A    8/1970    Howard
5,342,459 A    8/1994    Klemp et al.
(Continued)

FOREIGN PATENT DOCUMENTS

CN    103131904 A    6/2013
EP    0176187 A2    4/1986
(Continued)

OTHER PUBLICATIONS

"Aluminum 6064 Alloy (UNS A96064)" AzoM, Jul. 31, 2013. https://www.azom.com/article.aspx?ArticleID=8643. (Year: 2013).*
(Continued)

*Primary Examiner* — Paul A Wartalowicz
*Assistant Examiner* — Stephani Hill
(74) *Attorney, Agent, or Firm* — McBee Moore & Vanik IP, LLC

(57) ABSTRACT

The invention relates to extruded products suitable for turning, made from aluminium alloy with a composition (in weight %) of: 0.4-0.8 Si; 0.8-1.2 Mg; 0.20-0.4 Cu; 0.05-0.4 Fe; Mn≤0.10; Ti<0.15; Cr≤0.10; Bi≤0.8; Pb≤0.4; other elements <0.05 each and <0.15 remainder being aluminium, characterised in that the granular structure thereof is essentially recrystallized. The invention also relates to the method for the production of said products. The invention further relates to anodised turned mechanical parts obtained from extruded products according to the invention and to the
(Continued)

production method thereof. The products of the invention are particularly suitable for the production of brake pistons and gearbox elements.

18 Claims, 1 Drawing Sheet

(51) Int. Cl.
*B21C 23/14* (2006.01)
*C25D 11/16* (2006.01)

(56) References Cited

U.S. PATENT DOCUMENTS

| | | | |
|---|---|---|---|
| 5,776,269 A * | 7/1998 | Farrar, Jr. | ............ C22C 21/003 148/439 |
| 6,248,189 B1 | 6/2001 | Shaffer et al. | |
| 2009/0242087 A1 | 10/2009 | Morita et al. | |

FOREIGN PATENT DOCUMENTS

| | | |
|---|---|---|
| EP | 0761834 A1 | 3/1997 |
| EP | 2553131 A1 | 2/2013 |
| EP | 2664687 A1 | 11/2013 |
| JP | H0925533 A | 1/1997 |
| JP | H10265884 A | 10/1998 |
| JP | 2004292847 A | 10/2004 |
| JP | 2009013503 A | 1/2009 |

OTHER PUBLICATIONS

JP H10-265884 machine translation (Year: 1998).*
"Rod & Bar Alloy 6064 Technical Data", Kaiser Aluminum, Jan. 6, 2007, pp. 1-2, Retrieved from the Internet: URL: http://www.kaiseraluminum.com/wp-content/uploads/2007/05/rod-bar-alloy-6064.pdf [retrieved on Aug. 19, 2014].
Wood, W G Ed, "American Society for Metals", Metals Handbook, 9th Edition, Aluminum, Jan. 1, 1982, pp. 585-597, Metals Handbook, Surface Cleaning Finishing and Coating, Metals Park, Ohio.
Van Geertruyden, W. H. et al., "Surface Grain Structure Development During Indirect Extrusion of 6XXX Aluminum Alloys", Journal of Materials Science, Jul. 1, 2005, pp. 3861-3863, vol. 40, No. 14, Kluwer Academic Publishers.
Minoda, T. et al., "Effect of Grain Boundary Characteristics on Intergranular Corrosion Resistance of 6061 Aluminum Alloy Extrusion", Metallurgical and Materials Transactions A. Sep. 1, 2002, pp. 2891-2898, vol. 33, No. 9, Springer-Verlag, New York.
Bryant et al., "Effect of Extrusion Temperature on the Toughness of Aluminum Alloys Inextruded Form", Institute of Metals, Monograph and Report Series, Jan. 1, 1972, vol. 35, London, United Kingdom.
Royset, Jostein et al., "Comparison of Properties of Extruded 6XXX Alloys in T5 Temper Versus T6 Temper", Materials Forum, Jan. 1, 2004, pp. 300-304, vol. 28, Retrieved from the Internet: URL: http://www.materialsaustrailia.com.au/1ib/pdf/Materials_Forum/Volume28/GP 31.pdf [retrieved on Aug. 20, 2014].

* cited by examiner

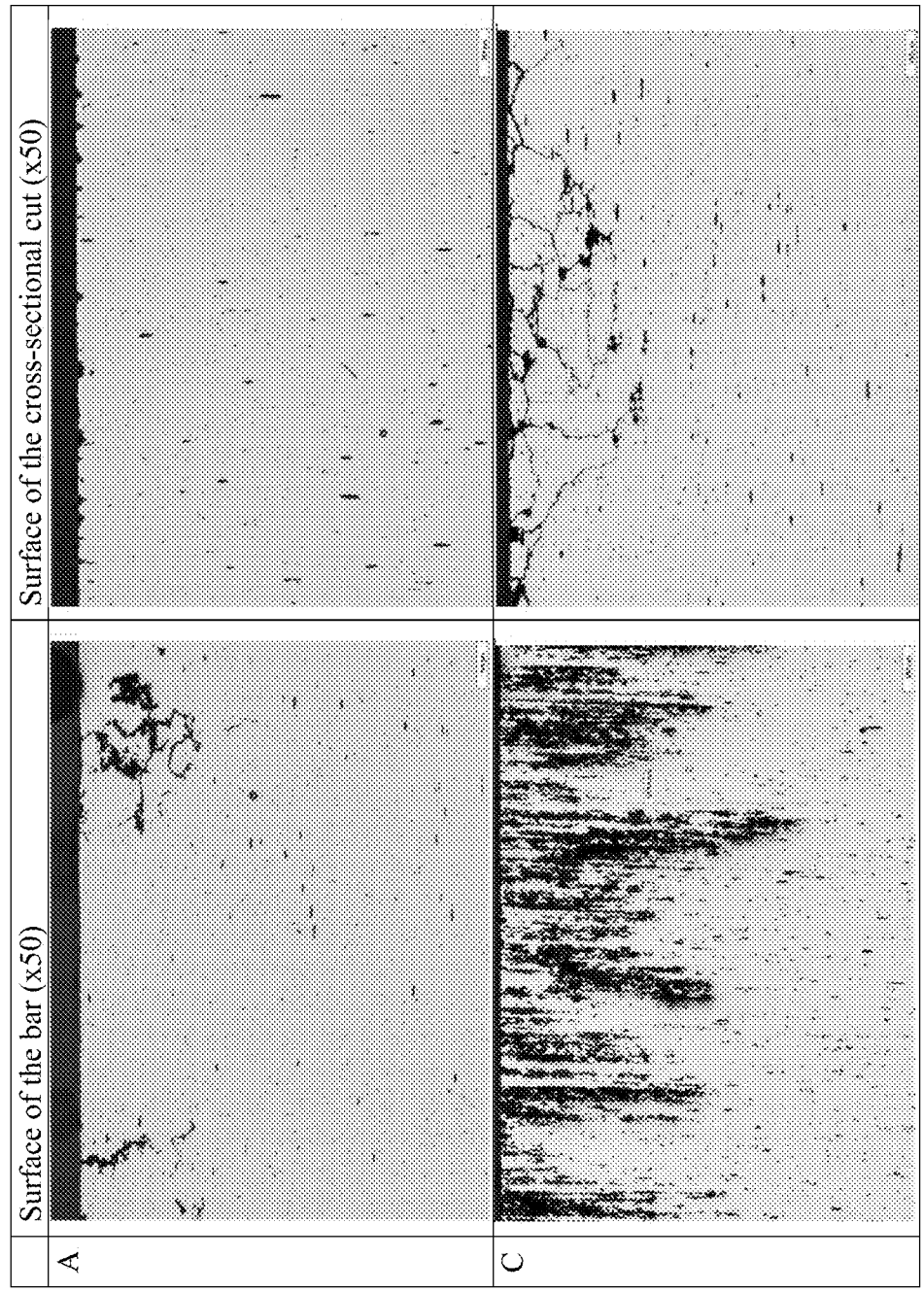

EXTRUDED 6XXX ALLOY PRODUCT THAT IS SUITABLE FOR TURNING AND HAS LOW ROUGHNESS AFTER ANODISATION

CROSS-REFERENCE TO RELATED APPLICATIONS

This application is a National Stage entry of International Application No. PCT/EP2015/000614, filed Mar. 20, 2015, which claims priority to French Patent Application No. 14/00703, filed Mar. 24, 2014.

FIELD OF THE INVENTION

The invention refers to turned parts obtained from extruded bar or rod products made of aluminum alloy from the AA6xxx series, and particularly parts that undergo a surface treatment after the machining.

PRIOR ART

Turning refers to a field of manufacturing involving the mass-production machining of mechanical parts, typically turned parts (screws, bolts, pins, pistons, etc.), by the removal of material from metal bars or rods.

In the case of aluminum alloys, these bars or rods are generally made by extrusion from billets.

In this way, the parts are made at high production rates on manually or numerically controlled cutting machines.

Productivity and surface condition, as well as the dimensional precision of the final part, are the primary objectives associated with this type of manufacturing. After machining, the parts may be given a protective surface treatment, typically anodizing. So-called hard anodizing, typically done at low temperature (0-5° C.) and a high current density in the presence of sulfuric acid, is capable of providing highly resistant coatings.

Parts produced in this way find applications in various fields, from timepieces to medical equipment, not to mention the fields of transportation (aviation, rail, automobile) and industry (electrical, electronic, hydraulic, etc.).

There is an increasing demand for turned mechanical parts having both a low roughness and a tough coating. In addition, the intergranular corrosion resistance of the resulting mechanical parts must be good enough so that the parts are not replaced too frequently. In particular, for certain applications such as brake pistons or gearbox parts, decreasing the roughness while providing a resistant coating would improve contact between the mechanical part and its gasket and thus decrease wear and extend the life of the parts. However, alloys that are well suited to turning generally contain numerous intermetallic phases which, during hard anodizing, generate a substantial amount of roughness.

It is therefore very difficult to obtain an extruded product that both lends itself well to turning and also has a low surface roughness after anodizing.

International application WO 2005/100623 describes alloys, preferably in extruded form, that are suitable for turning and have a composition in wt % of Si 0.6-2.0; Fe 0.2-1.0; Mg 0.5-2.0, Cu max 1.0, Mn max 1.5, Zn max 1.0, Cr max 0.35, Ti max 0.35, and Zr 0.04-0.3.

International application WO 2007/027629 describes a press quenching method for alloy 6020. The resulting product is well suited to turning.

International application WO 2008/112698 describes an extruded product having an excellent aptitude for turning with a composition in wt % of Si 0.8-1.5; Fe 1.0-1.8; Cu<0.1—Mn<1; Mg 0.6-1.2; Ni<3.0; Cr<0.25—Ti<0.1.

International application WO 2013/170953 describes a product having a composition in wt % of Si 1.3-12; Fe 1.35-1.8, in which Fe+Si is greater than 3.4; Cu 0.15-6; Mg 0.6-3; Mn<1; Cr<0.25; Ni<3—Zn<1—Ti<0.1—Bi<0.7—In<0.7—Sn<0.7. After machining and anodizing in order to obtain an oxide layer 30 μm thick, the lowest roughness value reached is 1.80 μm.

Anodizing methods for making oxide layers, notably on 6xxx alloys, are known, for example U.S. Pat. No. 3,524,799 or EP application 1 980 651. The alloys tested in these documents, such as alloy 6063 or 6463, are not known to be suitable for turning.

The problem that the present invention is intended to solve is that of producing extruded products that are both suitable for turning and resistant to intergranular corrosion, and which have a low roughness after anodizing.

Subject Matter of the Invention

A first subject matter of the invention is an extruded product suitable for turning, made of an aluminum alloy having a composition in wt % of Si 0.4-0.8; Mg 0.8-1.2; Cu 0.20-0.4; Fe 0.05-0.4; Mn≤0.10; Ti<0.15; Cr≤0.10; Bi≤0.8; Pb≤0.4; other elements <0.05 each and <0.15 total, balance aluminum, characterized in that the granular structure thereof is essentially recrystallized.

A second subject matter of the invention is the use of an extruded product according to the invention to make a brake piston or a gearbox part.

Another subject matter of the invention is a method for producing an extruded product according to the invention through the following steps a. an aluminum alloy according to the composition of the invention is prepared and then typically cast in the form of a billet b. said billet is homogenized at a temperature of at least 550° C., c. said homogenized billet is extruded to produce an extruded product, the initial extrusion temperature being less than 550° C., d. said extruded product is placed in a solution and quenched, preferably with water, with said immersion in solution being done either at the temperature generated during the extrusion process, or in a separate heat treatment, e. optionally, it is straightened and/or cold deformed, typically by traction and/or drawing, and/or said extruded product is naturally aged, f. artificial aging is performed at a temperature of between 150 and 200° C. for 5 to 25 hours, g. optionally, cold deforming is typically done by drawing said extruded product.

Yet another subject matter of the invention is a method for producing a turned and anodized mechanical part through the following steps a. an extruded product is prepared by the extruded product production method of the invention, b. the extruded product is machined to make a turned mechanical part, c. optionally, the resulting mechanical part is formed d. the resulting mechanical part is anodized, with the oxide thickness being at least 15 μm Yet another subject matter of the invention is a turned and anodized mechanical part made by the mechanical part production method of the invention.

DESCRIPTION OF THE FIGURES

FIG. 1: Observation of the samples after the standardized corrosion test conducted according to standard EN ISO 11846:2008 (method B).

DESCRIPTION OF THE INVENTION

Unless stated otherwise, all indications concerning the chemical composition of alloys are expressed as a percentage by weight based on the total weight of the alloy. The expression 1.4 Cu means that the copper content expressed in wt % is multiplied by 1.4. The alloy designations are made in compliance with the rules of the Aluminum Association, which are known to a person skilled in the art. Unless indicated otherwise, the definitions of standard EN 12258-1 apply. Unless indicated otherwise, the metallurgical temper definitions of standard EN 515 apply.

Unless indicated otherwise, the static mechanical specifications—in other words the ultimate strength Rm, conventional elastic limit at 0.2% elongation Rp0.2, and elongation at break A %—are determined by a tensile test according to standard ISO 6892-1, with the sample and direction of the test being defined by standard EN 485-1.

The turning capability is evaluated by a machining test as described in international application WO2013/170953 in paragraph [0039]. The test consists in determining the fragmentation ability of chips by measuring the number of chips in a given mass of collected chips, 100 g in the present case. The machining is done using an SP 12 CNC lathe and a rhombic insert with a basic shape of 80° sold under the registered trademark SANDVIK Coromant Coroturn® 107 as item CCGX 09 T3 04-AL, designed for aluminum alloys. The machining parameters used are a rotational speed of 3000 rpm, a feed of 0.3 mm/revolution, and a cutting depth of 3.5 mm. The extruded products of the invention are suitable for turning, that is, when subjected to the test described in international application WO2013/170953, paragraph [0039], they yield a number of chips for 100 g of chips of at least 3000 and preferably at least 4000. The corrosion resistance was assessed according to standardized test EN ISO 11846:2008 (method B). The surface area of the samples was 20 cm$^2$. The samples were prepared by degreasing with an organic solvent, immersion for 2 minutes in 5% sodium hydroxide at a temperature of 55° C., rinsing and immersion for 2 minutes in 2% nitric acid.

The corrosion test consists in submerging the sample thus prepared in a solution containing 30 g/l NaCl and 10 ml/l concentrated hydrochloric acid (p=1.19 g/ml) for 24 hours at ambient temperature.

Three roughness parameters measured according to ISO Standard 4287 are used:

$R_{max}$: maximum height of the roughness profile, i.e. the largest of the $R_{zi}$ values over the evaluation length $R_z$: Average height of the $R_z$ profile, i.e. the arithmetic mean of the individual $R_{zi}$ values over the evaluation length $R_a$: Mean roughness deviation, i.e. the arithmetic mean of all the ordinates of the profile over the evaluation length.

In the context of this invention, a granular structure such that the rate of recrystallization at one quarter thickness is greater than 70% and preferably greater than 90%, is called an essentially recrystallized granular structure. The recrystallization rate is defined as the surface fraction of a metallographic section occupied by recrystallized grains.

The present inventors have observed that for known turning alloys, such as alloys AA6262, AA6064A, or AA6042, or the alloy described in international application WO2013/170953, the roughness after anodizing making it possible to obtain an oxide layer at least 20 µm thick is much higher than the roughness before anodizing. Typically, even if a roughness such that $R_z$<0.01 µm is obtained after machining, the roughness after anodizing is at least 1.80 µm or more. Consequently, the presence of numerous intermetallic compounds in this type of alloy generates substantial roughness during anodizing.

The present inventors have observed that this problem is solved by controlling the composition of the alloy of the invention and the granular structure thereof.

The extruded products of the invention suitable for turning are made of an aluminum alloy having a composition in wt % of Si 0.4-0.8; Mg 0.8-1.2; Cu 0.20-0.4; Fe 0.05-0.4; Mn≤0.10; Ti<0.15; Cr≤0.10; Bi≤0.8; Pb≤0.4; other elements <0.05 each and <0.15 total, balance aluminum.

The simultaneous minimum values of silicon, magnesium, copper, and iron make it possible, in particular, to obtain extruded products suitable for turning. Alloys not having these minimum values, such as alloys 6063 or 6463, are not suitable for turning. Preferably, the copper content in this first embodiment is at least 0.23 wt %. In one embodiment of the invention, the copper content is at least 0.30 wt %. The iron content is preferably at least 0.20 wt % and advantageously 0.25 wt %. Advantageously, the composition is, in wt %, Bi 0.4-0.8 and Pb 0.2-0.4 and preferably Pb 0.2-0.34.

Preferably, the silicon content is between 0.5 and 0.7 wt % and/or the magnesium content is between 0.9 and 1.1 wt %. The essentially recrystallized structure is obtained, notably, by controlling the manganese content and the chromium content. Preferably, the manganese content is at most 0.05 wt %. Preferably, the chromium content is at most 0.08 wt %. Advantageously, the sum of the chromium and manganese content is such that, in wt %, Cr+Mn≤0.15 and preferably Cr+Mn≤0.10. Controlling the zirconium content can also be important for obtaining the essentially recrystallized structure. Advantageously, the zirconium content is less than 0.04 wt % and preferably less than 0.03 wt %.

The alloy and metallurgical structure of the extruded products of the invention are also advantageous, because the suitability thereof for extrusion is excellent, in particular the pressure required to initiate extrusion is lower, the extrusion rate is higher than for known allows, and no extrusion flaws such as hot tearing are observed.

Contrary to what could have been expected, the extruded products of the invention have satisfactory static mechanical strength properties: the elastic limit thereof preferably being at least 300 MPa in the T6 temper and the elongation being at least 10%, and the elastic limit thereof preferably being at least 330 MPa in the T9 temper and the elongation being at least 8%.

The present inventors have observed that an essentially recrystallized extruded product made of an alloy of the invention has an improved intergranular corrosion resistance. Consequently, the extruded products of the invention have an intergranular corrosion resistance per test ISO 11846, method B, such that the maximum corrosion depth on a cross-sectional cut of the extruded product is less than 200 μm and the corresponding attacked surface area is less than 50%.

In addition, the present inventors have observed that, surprisingly, an essentially recrystallized extruded product made of an alloy according to the present invention has improved roughness after machining and anodizing. Particularly, after mirror polishing and anodizing at a temperature of 30° C. with a solution comprising 180 g/l sulfuric acid and 14 g/l oxalic acid and 15 g/l glycerol in order to make an oxide layer measuring 30 μm thick, the extruded product of the present invention has a roughness Rz on a generatrix parallel to the extrusion axis that is equal to or less than 1.7 μm and preferably less than 1.2 μm.

The extruded products of the invention are also advantageous in that for a so-called "hard" anodizing, the anodizing time is decreased, which is favorable for productivity. Consequently, an extruded product according to the invention is characterized in that the anodizing time to obtain an anodic layer 30 μm thick in a solution of 200 g/l $H_2SO_4$ at 5° C. is less than 30 minutes for a current density of 3 $A/dm^2$; in other words, the oxide growth rate is greater than 1 μm/min. The subject matter of the invention is also the method for producing extruded products according to the invention.

In the production method of the invention, an aluminum alloy having a composition according to the invention is prepared and then typically cast in the form of a billet. The billet is then homogenized at a temperature of at least 550° C. and preferably at least 580° C. The chosen homogenization temperature helps to achieve an essentially recrystallized granular structure. The homogenized billet is then extruded, with the initial extrusion temperature being less than 550° C. and preferably less than 540° C. An initial extrusion temperature of at least 450° C. is preferred. After extrusion, the resulting extruded product is placed in a solution and quenched, preferably with water, with said immersion in solution being done either thanks to the heat generated during the extrusion process, or in a separate heat treatment.

Quenching at the extruder outlet while at extrusion heat, typically with water, is advantageous.

Optionally, the extruded product is straightened and/or cold deformed, typically by traction and/or drawing, and/or the extruded product is naturally aged. Advantageously, cold deformation is sufficient, typically at least 7%, to influence the mechanical properties after artificial aging. Any natural ageing is typically for a few hours to a few days. The extruded product is then artificially aged at a temperature of between 150 and 200° C. for 5 to 25 hours in order to obtain a T6 or T8 age treated temper.

It is possible after artificial aging to perform cold deforming, typically by drawing, so as to obtain a T9 temper.

Yet another subject matter of the invention is a method for producing a turned and anodized mechanical part through the following steps, a. an extruded product according to the invention is prepared, b. the extruded product is machined to make a turned mechanical part, c. optionally, the resulting mechanical part is formed d. the resulting mechanical part is anodized, with the oxide thickness being at least 20 μm In one embodiment, the anodizing is done at a temperature of between 0 and 10° C. with a solution containing 100 to 250 g/l sulfuric acid with a current density of 1 to 3 $A/dm^2$ with an oxide growth rate greater than 1 μm/min. Under these conditions, the extruded products according to the invention decrease the anodizing time compared to products according to the prior art.

In another embodiment, the anodizing is done at a temperature of between 15 and 40° C. with a solution comprising 100 to 250 g/l sulfuric acid and 10 to 30 g/l oxalic acid, and 5 to 30 g/l of at least one polyhydric alcohol. Advantageously, at least one polyhydric alcohol is chosen from ethylene glycol, propylene glycol, or glycerol. Preferably, the anodizing is done with a current density of between 1 and 5 $A/dm^2$, preferably between 2 and 4 $A/dm^2$.

Preferably, the thickness of the resulting anodic layer is between 15 and 40 μm.

The invention also relates to the turned and anodized mechanical parts obtained by the method of the invention. These mechanical parts are advantageous because they have both a roughness Rz on a generatrix parallel to the extrusion axis that is equal to or less than 2.3 μm and preferably equal to or less than 1.7 μm, and the intergranular corrosion resistance thereof according to test ISO 11846, method B, is such that the maximum corrosion depth on a cross-sectional cut of the extruded product is less than 200 μm and the corresponding attacked surface area is less than 50%.

The use of an extruded product according to the invention to make a turned mechanical part such as a brake piston or a gearbox part is advantageous.

EXAMPLES

Example 1

In this example, two alloys having the composition specified in Table 1 were prepared.

TABLE 1

| Composition of the alloys (wt %) | | | | | | | | | | |
|---|---|---|---|---|---|---|---|---|---|---|
| | Si | Fe | Cu | Mn | Mg | Cr | Ti | Zr | Ni | Pb | Bi |
| A | 0.6 | 0.26 | 0.24 | 0.03 | 1.1 | 0.05 | 0.02 | <0.01 | <0.01 | 0.25 | 0.5 |
| B | 0.7 | 0.40 | 0.30 | 0.11 | 1.0 | 0.11 | 0.02 | <0.01 | 0.01 | 0.38 | 0.7 |

The alloys were cast in the form of billets measuring 254 mm in diameter, homogenized at 585° C., then extruded in the form of bars with a 15×100 mm cross-section by direct extrusion, the initial extrusion temperature being 530° C. The pressure required to initiate extrusion was 140 bar for alloy A of the invention, significantly lower than the pressure required to initiate extrusion of alloy B, which was 160 bar. The extrusion rate was 8.3 m/min for the alloy A billet, whereas it was 7.2 m/min for alloy B. Tearing during extrusion was observed for alloy B, whereas these cracks were not observed for alloy A. Alloy A thus was more reliable than alloy B.

The extruded products were quenched upon exiting the press. The resulting bars were stretched to 1% and then subjected to artificial aging to achieve a T6 temper.

The resulting alloy A bar had a recrystallized granular structure at one quarter thickness, whereas the alloy B bar had a non-recrystallized granular structure at one quarter thickness. The mechanical properties of the resulting bars measured in the extrusion direction are shown in Table 2.

TABLE 2

Mechanical properties obtained

| Alloy | Rm (MPa) | $R_{p0.2}$ (MPa) | A % |
|---|---|---|---|
| A | 327 | 306 | 12 |
| B | 370 | 348 | 13 |

The resulting bars were suitable for turning.

The bars then underwent the following preparation treatments: 2 mm machining, mirror polishing, then anodizing according to method (1) or method (2) described in Table 3

TABLE 3

Description of anodizing methods 1 and 2

| Method | Pretreatment before anodizing | Anodizing electrolyte | Current density (A/dm²) | Temperature (° C.) | Oxide thickness (µm) |
|---|---|---|---|---|---|
| 1 | Degreasing with Novaclean D708 | 200 g/l $H_2SO_4$ | 3 | 5 | 30 |
| 2 | Degreasing with Novaclean D708 | 180 g/l $H_2SO_4$ + 14 g/l oxalic acid + 15 g/l glycerol | 2 | 30 | 30 |

The roughness results are shown in Table 4.

TABLE 4

Results of roughness measurements after anodization treatment.

| Alloy | Anodizing method | Current density (A/dm²) | Temperature (° C.) | Anodizing time (min) | Mean Ra (µm) | Average Rz (µm) | Average Rmax (µm) |
|---|---|---|---|---|---|---|---|
| A | 1 | 3 | 5 | 23 | 0.35 | 2.33 | 3.28 |
| A | 2 | 2 | 30 | 53 | 0.09 | 0.95 | 1.78 |
| B | 1 | 3 | 5 | 34 | 0.39 | 2.46 | 3.46 |

Example 2

In this example, two alloys having the composition specified in Table 5 were prepared.

TABLE 5

Composition of the alloys (wt %)

| | Si | Fe | Cu | Mn | Mg | Cr | Ti | Zr | Ni | Pb | Bi |
|---|---|---|---|---|---|---|---|---|---|---|---|
| A | 0.6 | 0.26 | 0.24 | 0.03 | 1.1 | 0.05 | 0.02 | <0.01 | <0.01 | 0.25 | 0.5 |
| C | 0.7 | 0.37 | 0.32 | 0.12 | 1.0 | 0.12 | 0.03 | <0.01 | <0.01 | 0.35 | 0.7 |

The alloys were cast in the form of billets measuring 254 mm in diameter, homogenized at 585° C., then extruded in the form of cylindrical bars and quenched upon exiting the press. The resulting bars were stretched to 1% and then subjected to artificial aging and drawn to produce bars measuring 14 mm in diameter.

The resulting alloy A bar had a recrystallized granular structure at one quarter thickness, whereas the alloy B bar had a non-recrystallized granular structure at one quarter thickness.

The resulting bars were suitable for turning.

The corrosion resistance was assessed at the middle of the bar according to standardized test EN ISO 11846:2008 (method B). The results are shown in Table 6 and in FIG. 1.

TABLE 6

Results of corrosion tests

| | Surface of the bar | | Surface of the cross-sectional cut | |
|---|---|---|---|---|
| Alloy | Maximum attacked depth (µm) | Relative attacked surface area (%) | Maximum attacked depth (µm) | Relative attacked surface area (%) |
| A | 330 | 20 | 50 | 10 |
| A | 300 | 10 | 80 | 10 |
| C | 305 | 100 | 690 | 100 |
| C | 300 | 100 | 720 | 100 |
| C | 370 | 100 | 600 | 100 |

Example 3

In this example, two alloys having the composition specified in Table 7 were prepared.

TABLE 7

| | composition of the alloys (wt %) | | | | | | | | | |
|---|---|---|---|---|---|---|---|---|---|---|
| | Si | Fe | Cu | Mn | Mg | Cr | Ti | Zr | Ni | Pb | Bi |
| D | 0.6 | 0.24 | 0.21 | 0.01 | 1.04 | 0.05 | 0.02 | <0.01 | <0.01 | 0.23 | 0.4 |
| E | 0.7 | 0.40 | 0.30 | 0.11 | 1.01 | 0.12 | 0.02 | <0.01 | <0.01 | 0.34 | 0.7 |

The alloys were cast in the form of billets, homogenized, and then extruded in the form of bars measuring 30 mm in diameter.

The extruded products were quenched upon exiting the press. The resulting bars were stretched to 1% and then subjected to artificial aging to produce bars with a T6 temper.

Both alloys D and E were tested in the T6 temper and are different in their granular structure. The resulting alloy D bar had a recrystallized granular structure at one quarter thickness, whereas the alloy E bar had a non-recrystallized granular structure at one quarter thickness. The mechanical properties of the resulting bars measured in the extrusion direction are shown in Table 8.

TABLE 8

| Mechanical properties obtained | | | | | |
|---|---|---|---|---|---|
| Alloy | Temper | Bar diameter (mm) | Rm (MPa) | $R_{po,2}$ (MPa) | A % |
| D | T6 | 30 | 330 | 298 | 17.9 |
| E | T6 | 30 | 359 | 341 | 12.6 |

Example 4

In this example, two alloys having the composition specified in Table 9 were prepared.

TABLE 9

| | composition of the alloys (wt %) | | | | | | | | | |
|---|---|---|---|---|---|---|---|---|---|---|
| | Si | Fe | Cu | Mn | Mg | Cr | Ti | Zr | Ni | Pb | Bi |
| F | 0.6 | 0.23 | 0.27 | 0.04 | 1.06 | 0.05 | 0.02 | <0.01 | 0.01 | 0.28 | 0.5 |
| G | 0.6 | 0.26 | 0.24 | 0.01 | 1.03 | 0.07 | 0.02 | <0.01 | 0.01 | 0.24 | 0.4 |

The alloys were cast in the form of billets measuring 261 mm in diameter, homogenized at 585° C., then extruded in the form of bars.

The extruded products were quenched upon exiting the press. The resulting bars were stretched to 1% then subjected to artificial aging followed by cold deformation in order to obtain a product with a T9 temper. Alloy F was drawn so as to obtain a bar measuring 24.5 mm in diameter, and alloy G a bar measuring 26 mm in diameter.

The resulting alloy F and G bars have a recrystallized granular structure at one quarter thickness.

The mechanical properties of the resulting bars of temper T9, measured in the extrusion direction, are shown in Table 9.

TABLE 9

| Mechanical properties obtained | | | | | |
|---|---|---|---|---|---|
| Alloy | Temper | Bar diameter (mm) | Rm (MPa) | $R_{p0.2}$ (MPa) | A % |
| F | T9 | 24.5 | 352 | 344 | 9 |
| G | T9 | 26 | 357 | 346 | 9 |

Example 5

In this example, an alloy having the composition specified in Table 10 was prepared.

TABLE 10

| | composition of the alloys (wt %) | | | | | | | | | |
|---|---|---|---|---|---|---|---|---|---|---|
| | Si | Fe | Cu | Mn | Mg | Cr | Ti | Zr | Ni | Pb | Bi |
| H | 0.6 | 0.24 | 0.21 | 0.01 | 1.04 | 0.05 | 0.02 | <0.01 | 0.01 | 0.23 | 0.4 |

The alloy was cast in the form of billets measuring 261 mm in diameter, homogenized, then extruded in the form of bars.

One bar was quenched upon exiting the press, stretched to 1%, then cold deformed to obtain a final diameter of 24.6 mm, then subjected to artificial aging to obtain a product with a T8 temper.

Another bar was quenched upon exiting the press, cold stretched to approximately 1%, then subjected to artificial aging followed by cold deformation in order to achieve a final diameter of 24.5 mm so as to produce a product with a T9 temper.

The resulting alloy H bars have a recrystallized granular structure at one quarter thickness.

The mechanical properties of the resulting bars of temper T8 and T9, measured in the extrusion direction, are shown in Table 11.

The turning capability was assessed by a machining test as described in international application WO 2013/170953 in paragraph [0039]. The test consists in determining the fragmentation ability of chips by measuring the number of chips in a given mass of collected chips, 100 g in the present case. The weight of 50 chips was also determined. The results are shown in Table 11.

The machining is done using an SP 12 CNC lathe and a rhombic insert with a basic shape of 80° sold under the registered trademark SANDVIK Coromant Coroturn® 107 as item CCGX 09 T3 04-AL, designed for aluminum alloys. The machining parameters used are a rotational speed of 3000 rpm, a feed of 0.3 mm/revolution, and a cutting depth of 3.5 mm.

TABLE 11

Results obtained after the turning suitability test described in international application WO 2013/170953, paragraph [0039]

| Alloy | Temper | Bar diameter (mm) | Rm (MPa) | $R_{p0.2}$ (MPa) | A % | Number of chips in 100 g | Weight of 50 chips (g) |
|---|---|---|---|---|---|---|---|
| H | T9 | 24.5 | 380 | 357 | 8 | 4272 | 1.1705 |
| | T8 | 24.6 | 348 | 321 | 15.6 | 4744 | 1.0539 |

The invention claimed is:

1. An extruded product for turning, made of an aluminum alloy consisting of a composition in wt % of Si 0.4-0.8; Mg 0.8-1.2; Cu 0.20-0.4; Fe 0.05-0.4; Mn≤0.10; Ti≤0.15; Cr≤0.10; Bi 0.4-0.8; Pb 0.2-0.34; other elements <0.05 each and <0.15 total, balance aluminum,
   wherein Cr+Mn≤0.10,
   wherein a rate of recrystallization at one quarter thickness of the granular structure thereof is greater than 70%, and
   wherein after mirror polishing and anodizing at a temperature of 30° C. with a solution comprising 180 g/l sulfuric acid and 14 g/l oxalic acid and 15 g/l glycerol to make an oxide layer 30 μm thick, the product has a roughness $R_z$ on a generatrix parallel to the extrusion axis that is equal to or less than 1.7 μm.

2. The extruded product according to claim 1, wherein the copper content is at least 0.23 wt % and/or the iron content is at least 0.20 wt %.

3. The extruded product according to claim 1, wherein anodizing time to obtain an anodic layer 30 μm thick in a solution of 200 g/l $H_2SO_4$ at 5° C. is less than 30 minutes for a current density of 3 A/dm².

4. The extruded product according to claim 1, wherein intergranular corrosion resistance thereof per test ISO 11846, method B, is such that a maximum corrosion depth on a cross-sectional cut of the extruded product is less than 200 μm and a corresponding attacked surface area is less than 50%.

5. The extruded product according to claim 1, wherein said roughness $R_z$ on a generatrix parallel to the extrusion axis is less than 1.2 μm.

6. The extruded product according to claim 1, wherein the copper content is at least 0.30 wt % and/or the iron content is at least 0.25 wt %.

7. The extruded product according to claim 1, wherein the silicon content is between 0.5 and 0.7 wt %.

8. The extruded product according to claim 1, wherein the magnesium content is between 0.9 and 1.1 wt %.

9. The extruded product according to claim 1, wherein the manganese content is at most 0.05 wt % and/or the chromium content is at most 0.08 wt %.

10. The extruded product according to claim 1, wherein an elastic limit thereof is at least 300 MPa in T6 temper and elongation is at least 10% in T6 temper.

11. The extruded product according to claim 1, wherein an elastic limit thereof is at least 330 MPa in T9 temper and elongation is at least 8% in T9 temper.

12. The extruded product according to claim 1, wherein the rate of recrystallization at one quarter thickness is greater than 90%.

13. The extruded product according to claim 1, wherein the extruded product is produced by a method comprising:
   a. preparing the aluminum alloy having said composition and casting in a form of a billet,
   b. homogenizing said billet at a temperature of at least 550° C.,
   c. extruding said homogenized billet to produce an extruded product, an initial extrusion temperature being less than 550° C.,
   d. placing said extruded product in a solution and quenching, optionally with water, with the placing in solution being done either at a temperature generated during (c), or in a separate heat treatment,
   e. artificially aging the product of step (d) at a temperature of between 150 and 200° C. for 5 to 25 hours.

14. The extruded product according to claim 13, wherein in (b), the temperature is at least 580° C.

15. The extruded product according to claim 13, wherein in (c), the initial extrusion temperature is less than 450° C.

16. The extruded product according to claim 1, wherein the extruded product is produced by a method comprising:

a. preparing the aluminum alloy having said composition and casting in a form of a billet,
b. homogenizing said billet at a temperature of at least 550° C.,
c. extruding said homogenized billet to produce an extruded product, an initial extrusion temperature being less than 550° C.,
d. placing said extruded product in a solution and quenching, optionally with water, with the placing in solution being done either at a temperature generated during (c), or in a separate heat treatment,
e. straightening and/or cold deforming, optionally by traction and/or drawing, and/or naturally aging the product from step (d),
f. artificially aging the product of step (e) at a temperature of between 150 and 200° C. for 5 to 25 hours,
g. cold deforming the product of step (f), optionally by drawing.

17. The extruded product according to claim 1, wherein the extruded product is produced by a method comprising:
a. preparing the aluminum alloy having said composition and casting in a form of a billet,
b. homogenizing said billet at a temperature of at least 550° C.,
c. extruding said homogenized billet to produce an extruded product, an initial extrusion temperature being less than 550° C.,
d. placing said extruded product in a solution and quenching, optionally with water, with the placing in solution being done either at a temperature generated during (c), or in a separate heat treatment,
e. straightening and/or cold deforming, optionally by traction and/or drawing, and/or naturally aging the product from step (d),
f. artificially aging the product of step (e) at a temperature of between 150 and 200° C. for 5 to 25 hours.

18. The extruded product according to claim 1, wherein the extruded product is produced by a method comprising:
a. preparing the aluminum alloy having said composition and casting in a form of a billet,
b. homogenizing said billet at a temperature of at least 550° C.,
c. extruding said homogenized billet to produce an extruded product, an initial extrusion temperature being less than 550° C.,
d. placing said extruded product in a solution and quenching, optionally with water, with the placing in solution being done either at a temperature generated during (c), or in a separate heat treatment,
e. artificially aging the product of step (d) at a temperature of between 150 and 200° C. for 5 to 25 hours,
f. cold deforming the product of step (e), optionally by drawing.

* * * * *